Patented Oct. 5, 1926.

1,602,062

UNITED STATES PATENT OFFICE.

CYRUS FIELD WILLARD, OF SAN DIEGO, CALIFORNIA.

PROCESS FOR DEVULCANIZING VULCANIZED RUBBER AND THE PRODUCT THEREOF.

No Drawing.  Application filed November 19, 1923. Serial No. 675,712.

The present process relates to a process for devulcanizing vulcanized rubber so that the rubber when devulcanized may be produced in such a form that it can be used for the purpose of making rubber paint and for other purposes for which rubber in solution is now used.

In this respect it is an improvement on the devulcanizing processes for which United States Patents Numbers 1,322,077, 1,322,151 and 1,322,152 were issued to me under date of November 18, 1919 since it puts the rubber so devulcanized in such a condition or "solution" that it can be used for all purposes for which rubber in solution is now used, thereby producing new and useful products which will be in some respects better and which will be cheaper for the purpose than new crude rubber.

This improved process, herein described, devulcanizes vulcanized rubber so that it is put into such a condition that it may be dissolved later if desired in another operation or it may be carried on at such length in the same vessel as to put the devulcanized rubber into solution all in the one operation.

It is understood that the term solution is the one that is generally used in such cases where the rubber is really "swelled" and only appears to be in a true solution.

The first steps in the process are the same as in the processes that are covered by the above-cited patents and hence no elements of novelty are claimed thereon. The old vulcanized rubber is cut or ground to pass a screen of about one-eighth mesh. When there is cotton or other fiber mixed with the rubber, the process of devulcanization is carried on in the presence of the fiber without destroying the fiber, as covered in two of my former patents. In this process the fiber is removed in any desired manner and sold or otherwise disposed of.

The comminuted rubber of the desired size is placed in the emulsoid colloid solution described in my Patent No. 1,322,152, which solution may be of tar, rosin, pitch, resins, gums or balsams. In the patent last cited, devulcanization is produced by the preferred use of a tar solution combined with any of the known sulfur solvents, which solution being of a viscous or gummy nature acts to make the adsorption process of vulcanization a reversible one by providing an adsorption medium as a substitute for the rubber and with which substitute adsorption medium the sulfur of vulcanization, when released from the rubber under proper conditions of heat and moisture with the assistance of a sulfur solvent, may be adsorbed and be removed from the rubber.

In this process, as herein described, the sulfur solvent which is used must be one that is also a solvent of rubber and hence may not be any of the known sulfur solvents, but limited to a few.

In the same manner as is described in former patents, the rubber and emulsoid colloids solution with the sulfur and rubber solvent, are placed with water in a kettle under steam pressure which may vary according to the quality of rubber to be devulcanized. With 1,000 pounds of ground rubber scrap about 400 pounds of tar and 24 gallons of sulfur and rubber solvent, preferably benzole, with enough water to make a heightened disperse phase. With some very fine rubber the proportions of tar may be reduced to 100 pounds with 6 gallons of the sulfur solvent which is also a solvent of rubber to the 1,000 pounds of scrap.

Instead of washing the devulcanized product with a dilute solution (say 3% to 6% of caustic soda, (NaOH)) as is described in the former cited patents, after the vulcanized rubber and devulcanizing solution have been boiled together, say from 8 to 10 hours, in a closed kettle under pressure until the rubber is devulcanized, the boiling is continued under increased pressure until the now devulcanized rubber is practically dissolved by the rubber solvent. The steam may then be shut off from the kettle containing the rubber and emulsoid colloid solution with the rubber solution and the kettle allowed to cool (over night preferred) so as to permit the volatile elements to condense and be saved. If it is desired to use the kettle again immediately, it may be advisable to put in a system of solvent recovery connected with the kettle, which will allow it to be emptied and used again immediately.

Instead of using by preference turpentine with the tar, benzole or any other sulfur solvent which also dissolves rubber may be used and this is boiled in the tar and water with the vulcanized rubber until devulcanization takes place. Instead of stopping then, as in the former patents, the boiling is continued until the devulcanized rubber is in a condition where it can be dissolved with a rubber solvent. The boiling may also be continued thereafter until the rubber is dissolved in the benzole and has formed a rubber solution, which it will do after the rubber has been freed from the sulfur and the hot rubber solvent has dissolved the devulcanized rubber. If the rubber is not thoroughly dissolved after it has been boiled with the devulcanizing and solvent solution all day and has stood over night, it may be drawn off and allowed to stand in tanks or other receptacles until such time as the rubber is thoroughly dissolved. When the solution has cooled sufficiently the tar, and other compounds should settle to the bottom of the vessel after being "tanked", and the rubber in solution may be drawn off for use. It may then be screened from any fiber or other material contained therein and used for making paint with the rubber in solution acting as the body, the solvent acting as the vehicle while any desired pigment may be added and the whole ground together in a paint mill. Or the rubber solution may be used for the many other uses for which new crude rubber in solution is used, for dipped and spread goods, for cement and all the other uses, either alone or mixed with dissolved new crude rubber, as may be desired.

It may be advisable to thin this solution down with gasolene or gasolene and kerosene mixed.

What I claim as new and desire to secure by Letters Patent, is:—

1. The process of devulcanizing vulcanized rubber which comprises boiling such rubber with an emulsoid colloid solution and a sulfur solvent which is also a rubber solvent, for a sufficient length of time to devulcanize the rubber, and then putting the devulcanized rubber into a state of solution with the solvent employed by continuing the boiling in the same solution.

2. The process of devulcanizing vulcanized rubber which comprises boiling such rubber in an emulsoid colloid solution and a sulfur solvent which will dissolve rubber as well as sulfur to devulcanize the rubber and after the rubber is devulcanized to continue the boiling until the rubber has been more or less dissolved and then tanking the mixture until complete solution has been affected.

3. The process of devulcanizing vulcanized rubber which comprises boiling such rubber in a solution of tar and benzole until the rubber has been devulcanized and then allowing the rubber to remain in such a solution until the tar has softened and the benzole has dissolved the rubber to make a rubber solution.

4. The process of devulcanizing vulcanized rubber which comprises boiling such rubber with an emulsoid colloid solution and a sulfur solvent which is also a rubber solvent until it is devulcanized and then dissolving such devulcanized rubber with such solvent into a rubber solution, all in the one operation.

5. The process of devulcanizing vulcanized rubber which comprises boiling such rubber in a covered vessel under pressure with an emulsoid colloid solution and a sulfur and rubber solvent until devulcanized and then continuing the operation until the rubber is dissolved after which the solutions are allowed to cool in the closed vessel in which the operation has been conducted until all the volatile elements have cooled and been condensed.

6. The process of devulcanizing vulcanized rubber which comprises boiling the rubber with a solution of a viscous or gummy nature, to make the adsorption process of vulcanization reversible by providing an adsorption medium as a substitute for the rubber and with which substitute adsorption medium the sulfur of vulcanization, when released from the rubber under proper conditions of heat and moisture with the assistance of a sulfur solvent, will be adsorbed and then, when the released sulfur has been adsorbed with the substitute adsorption medium and the rubber devulcanized, continuing the boiling of the devulcanized rubber in the same vessel and solution with the sulfur solvent which is also a rubber solvent, until the rubber has gone into solution with solvent employed.

7. The product obtained by the devulcanizing of vulcanized rubber by boiling such rubber with an emulsoid colloid solution and a sulfur solvent which is also a rubber solvent until the rubber is devulcanized and then dissolving such devulcanized rubber in the same vessel in which it was devulcanized by continuing the boiling until the solvent has made a solution of the rubber after it has been devulcanized.

CYRUS FIELD WILLARD.